(12) United States Patent
Wilmering et al.

(10) Patent No.: US 10,869,429 B2
(45) Date of Patent: Dec. 22, 2020

(54) ROTATABLE ILLUMINATION DEVICE WITH CONTROL AND SENSING SYSTEMS

(71) Applicant: Mold Metis, Inc., Eldorado Springs, CO (US)

(72) Inventors: Thomas Wilmering, Westminster, CO (US); Brian Curry, Westminster, CO (US); Friso Schlottau, Lyons, CO (US)

(73) Assignee: Mold Metis, Inc., Eldorado Springs, CO (US)

(*) Notice: Subject to any disclaimer, the term of this patent is extended or adjusted under 35 U.S.C. 154(b) by 0 days.

(21) Appl. No.: 15/947,458

(22) Filed: Apr. 6, 2018

(65) Prior Publication Data
US 2018/0359934 A1    Dec. 20, 2018

Related U.S. Application Data

(60) Provisional application No. 62/482,384, filed on Apr. 6, 2017.

(51) Int. Cl.
| | | |
|---|---|---|
| *A01G 7/04* | (2006.01) | |
| *F21V 14/02* | (2006.01) | |
| *F21V 21/30* | (2006.01) | |
| *F21V 23/04* | (2006.01) | |
| *F21V 33/00* | (2006.01) | |
| *F21Y 115/10* | (2016.01) | |

(52) U.S. Cl.
CPC .............. *A01G 7/045* (2013.01); *F21V 14/02* (2013.01); *F21V 21/30* (2013.01); *F21V 23/0442* (2013.01); *F21V 33/0096* (2013.01); *F21Y 2115/10* (2016.08); *Y02P 60/14* (2015.11)

(58) Field of Classification Search
CPC ........ A01G 9/249; A01G 7/045; G09F 13/30; G09F 13/34; G09F 13/36; F21V 14/02; F21V 14/025
See application file for complete search history.

(56) References Cited

U.S. PATENT DOCUMENTS

| | | | |
|---|---|---|---|
| 4,734,830 A * | 3/1988 | Cristian | ................. A01G 7/045 362/1 |
| 4,745,526 A | 5/1988 | Sestak | |
| 5,014,225 A | 5/1991 | Vidaver et al. | |
| 5,082,422 A * | 1/1992 | Wang | .................... F04D 25/088 362/234 |

(Continued)

FOREIGN PATENT DOCUMENTS

KR    20130078716 A    7/2013

OTHER PUBLICATIONS

International Search Report and Written Opinion, dated Jul. 5, 2018.

*Primary Examiner* — Ismael Negron
(74) *Attorney, Agent, or Firm* — Lewis Brisbois Bisgaard & Smith LLP

(57) ABSTRACT

An illumination device, which may include a plurality of housing members, a plurality of light emitting elements arranged on each of the housing members, a motor coupled to the housing members to rotate them about a central axis, a sensor system for providing a signal in response to a condition of an area of interest, and control system for controlling the rotational speed of the motor, and selectively energizing the light emitting elements in response to the signal from the sensor, to provide the desired target area with a desired illumination output.

20 Claims, 14 Drawing Sheets

(56) References Cited

U.S. PATENT DOCUMENTS

| | | | | |
|---|---|---|---|---|
| 5,717,416 | A * | 2/1998 | Chakrabarti | G09G 3/003 345/31 |
| 5,903,224 | A * | 5/1999 | Reynolds | G09F 21/045 340/432 |
| 6,036,331 | A * | 3/2000 | Acquisto | F04D 25/088 362/234 |
| 6,037,876 | A * | 3/2000 | Crouch | G09F 9/33 340/815.53 |
| 6,688,759 | B1 * | 2/2004 | Hadjimichael | A01G 7/045 362/405 |
| 7,090,367 | B2 * | 8/2006 | Eversley | F21S 10/00 362/35 |
| 7,397,387 | B2 * | 7/2008 | Suzuki | G09G 3/005 340/815.4 |
| 8,221,077 | B2 * | 7/2012 | Pelshak | F04D 25/088 416/210 R |
| 9,901,039 | B1 * | 2/2018 | Dellerson | F04D 29/384 |
| 2005/0007761 | A1 | 1/2005 | Eversley | |
| 2010/0175318 | A1 * | 7/2010 | Ahmadi | A01G 7/045 47/66.6 |
| 2013/0139437 | A1 | 6/2013 | Maxik et al. | |
| 2013/0283683 | A1 | 10/2013 | Ringbom et al. | |
| 2016/0198638 | A1 * | 7/2016 | Millar | A01G 7/045 47/58.1 LS |

* cited by examiner

ROTATABLE ILLUMINATION DEVICE WITH CONTROL AND SENSING SYSTEMS

BACKGROUND

In the field of horticulture, artificial light can be beneficial, both as a supplement to sunlight, and as a primary source of light. There are challenges in artificial light, such as presenting photons to the plants (canopy or area of interest) in a way where they are best utilized (photon capture), effectively dissipating the heat generated by lights (to keep from overheating the plants themselves and the area in which they are grown). In the case of supplemental lighting, the shading or blocking of useful ambient light (typically sunlight) by the fixtures themselves. Also, there are opportunities to improve yields with "intra-canopy" lighting, where lighting is provided from areas other than the top of the canopy.

Further, different plant types have different needs for both photosynthesis (converting light energy into chemical energy) and photomorphogenesis (light-mediated development, where plant growth patterns respond to the light spectrum). Plants can sense light direction, quality (wavelength), intensity and periodicity. In addition to the mechanisms above, light induces phototropism, chloroplast differentiation and various other responses such as flowering and germination. Also, other living organisms such as algae and poultry also benefit from specific delivery of light energy.

While direct light is useful, there is considerable evidence that plants also benefit from diffuse light; so rather than just bombard the plants with photons from one direction, photons from many different and changing directions can be useful. Also, current full and supplemental horticultural lights provide direct light, which is very intense in the center, and tapers in intensity at the edges. Sunlight, on the other hand, is direct, diffuse, and even.

SUMMARY

The present disclosure is in the technical field of photon delivery. More particularly, the present disclosure relates to a fixture and method for delivering both full and supplemental lighting or photon delivery for use cases such as horticulture, circadian rhythm manipulation, task lighting, and other uses.

DETAILED DESCRIPTION

Figure 1A:
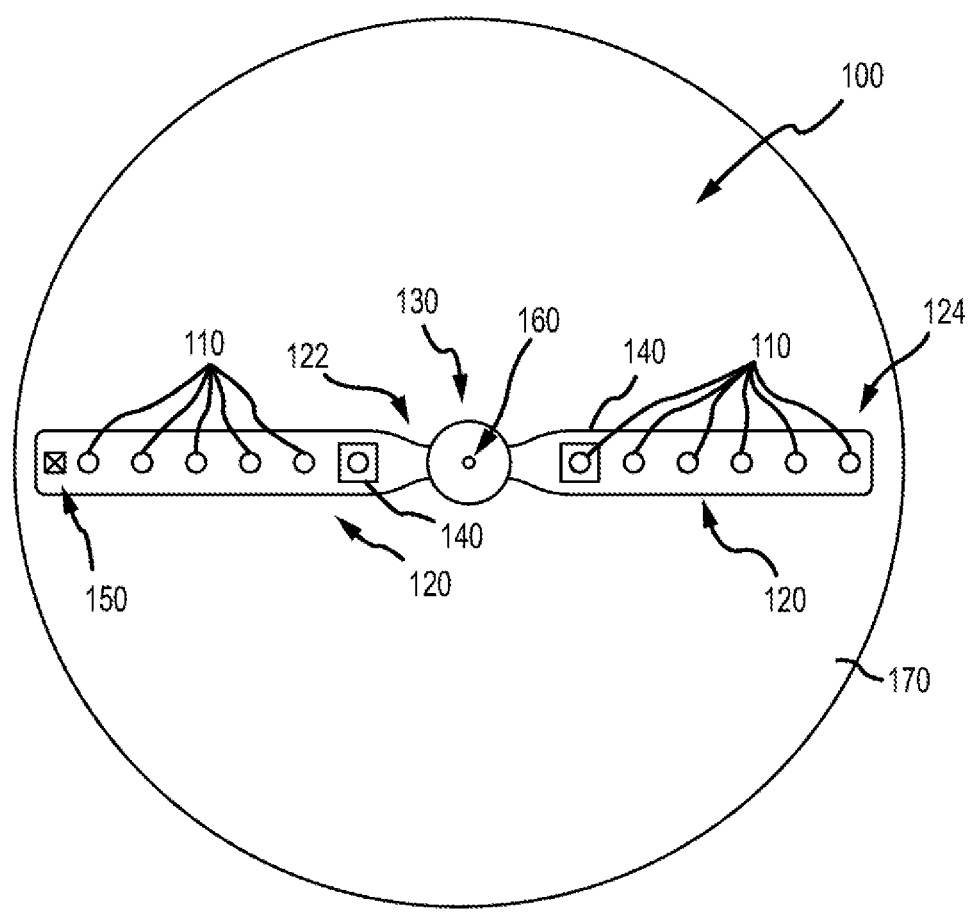
FIG. 1A shows a photon delivery device and an area of interest, according to an embodiment.

The present disclosure generally describes a photon delivery devices, systems, and methods, which provide a desired distribution of photons to an area of interest. FIG. 1A is a photon delivery device 100 according to an embodiment. Device 100 may include one or more electromagnetic radiation (EMR) emitters 110, and one or more housing members 120, a rotational device 130. Device 100 may also include one or more electromagnetic radiation (EMR) shaping apparatuses 140, and sensing system 150.

Emitters 110 are statically or moveably coupled adjacent housing members 120. Emitters 110 are capable of emitting electromagnetic radiation in certain wavelengths, and can be characterized as quanta (photons). Emitters 110 may include any device, system or method which is capable of the functionality described herein, such as light emitting diodes, high pressure sodium lamps, metal halide lamps, florescent lamps, incandescent lamps, halogen lamps, etc. or combinations thereof.

Housing members 120 are capable of receiving and coupling to emitters 110. Housing members 120 mat also be coupe to rotational device 130 at an inner portion 122. Emitters 110 may be coupled to housing members 120 in a spaced apart relationship at fixed or moveable locations. Emitters 110 may also be capable of moving during use.

Emitters 110 may also move with respect to housing members 120 during rotation. The movement could be parallel or normal to the central axis 160. This may be accomplished by mechanical means, such as a cam. This may be accomplished by the movement of air as the housing member 120 rotates. The emitters 110 may also be configured to rotate on an axis either parallel or normal to the central axis 160.

In one embodiment, housing members may be generally fan blade shaped, and rotational device 130 may be a motor configured to rotate housing members 120 about a central axis 160. In this configuration, emitters 110 would be rotated about the central axis 160, and delivers photons to an area of interest 170.

In an embodiment, housing members 120 may also be generally fan blade shaped to improve heat and moisture transfer for improved organism development, if desired for the application. In embodiments where air movement is not desired, housing members 120 may be another shape to inhibit air movement. Housing members 120 may also include a generally wing shaped leading edge with differences in the shape of the edge to allow even heat transfer in spite of differences in speed of the housing members 120. The pitch of the housing members 120 may also be varied based on desired photon deliver to the area of interest 170.

By rotating the emitters 110 about the central axis 160, improves photon delivery to the area of interest 170 by constantly changing the position of the emitters 110 relative to the area of interest 170.

Rotational device 130 may be capable of coupling adjacent housing members 120, and rotating them about the central axis 160. In an embodiment, rotational device 130 may be an electric motor and device 100 may be generally in the form of a ceiling fan. In some embodiments, rotational device 130 may include rotary slip ring, transformer, generator, or other device for delivering power to the emitters 110. In various embodiments, rotational device 130 may include an electric motor, pulley and gears, or other device, system, or method, or combinations thereof, for rotating housing members 120 about the central axis 160.

In an embodiment, as the housing members 120 are rotated or moved, air travels around the housing members 120 creating a cooling effect for the emitters 110. This acts as a heat exchanger, and would reduce the cost and size of the emitter package, and would increase the life of the emitters, and maintain the brightness of the emitters 120.

The housing members 120 could also include material with heat exchanging properties to enhance heat exchange for the benefits noted above, or to allow direct assembly of lights to the housing members 120. The housing members 120 could also include translucent materials to enhance photon delivery.

Housing members 120 may be modular, interchangeable to allow either full reconfiguration of the emitter 110 type, device 100, or to allow user defined combinations of emitter types to meet specific use cases.

Device 100 may include shaping apparatuses 140, which may be configured to shape or change the emitted photons from emitters 110 and the distribution of photons on the area of interest 170. Shaping apparatuses 140 may include filters, lenses, reflectors, or any other devices, systems, or methods for manipulating the emitted photons.

In this embodiment, area of interest 170 may generally be circular and may be generally an amount larger than the diameter of device 100. The amount larger may be due to the characteristics of the emitter 110 at the outer end 124 of housing member 120, and the distance from the emitters 100 and the area of interest 170.

Sensing system 150 may include one or more sensors in a spaced apart relationship coupled to the housing member 120. The sensing system 150 may be capable of sensing electromagnetic radiation from the area of interest 170, which can be used as an indication of the effectiveness of the photon delivery. The sensors may also be capable of detecting generally red, green, or blue light, which can aid in the change of delivery of photons. The system 150 may also be able to sense gas analysis, air flow, temperature, moisture content, distance to canopy, and/or area of interest 170.

These sensed parameters may be used to enhance the operation of the system and devices 100. The system and devices 100 may be controlled based at least in part on the sensed parameters. The device 100 may be raised or lowered with respect to the area of interest 150 based at least in part on the various sensed parameters.

The devices 100 and system may also be controlled to changes the rotational speed of the housing members 120, to create an oscillating effect on the canopy or area of interest 170. The housing members 120 may also be designed to accomplish this effect.

In embodiments, the area of interest 170 may be characterized as a plane, but in the embodiment with plants, may be a three-dimensional area, which may change as a function of time. In the aquaculture embodiment, the area of interest 170 may be the surface of a body of water or depths within the body of water. Area of interest 170 may include various shapes and sized based at least in part on the application device 100 is used for, and may change based on time, and other factors.

In some embodiments, area of interest 170 may be the canopy of plant(s), and may change as the height of the plants changes. The area of interest could also include a surface of body of water for aquaculture, or the floor of a facility for growing other organisms or animals.

Figure 1B:
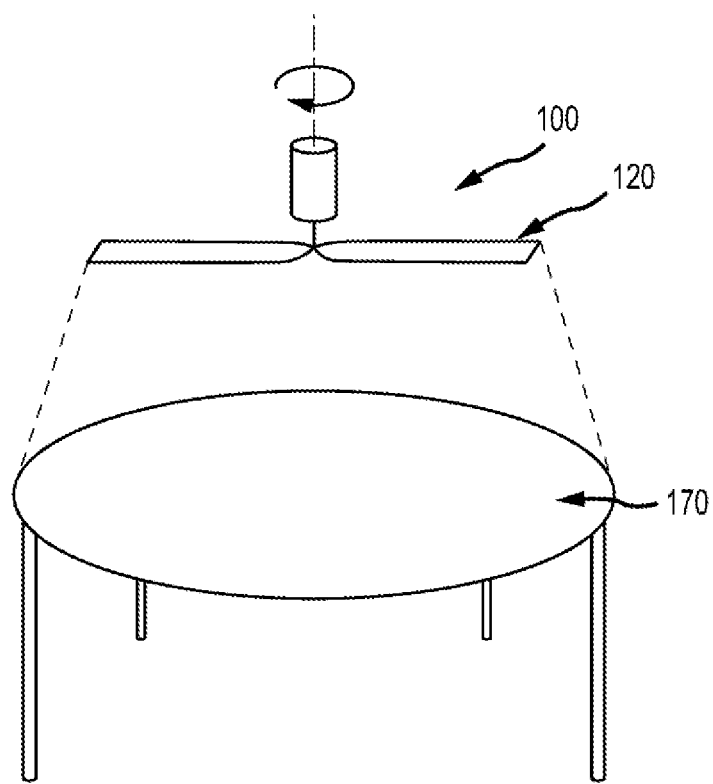
FIG. 1B shows an example photon delivery device and area of interest, according to an embodiment.

FIG. 1B is a plan view of photon delivery device 100 with housing members 120, and area of interest 170 as a table top. In this embodiment, the table top could be supporting plants in a horticulture environment.

Device 100 can be used as sole source, or as supplemental source, with minimal blocking of other light sources (such as sunlight); in a case of using light source(s) as supplemental light in a green house, this form factor has a small "shadow", allowing ambient sun and other light sources to reach the area of interest 170.

The devices, systems, and methods of the present disclosure generally describes a photon delivery devices 100, systems, and methods, which can greatly improve the opportunities photon capture by any area of interest 170 (specifically for living organisms within the area of interest), provide an improvement to the heat removal mechanisms, provide improved methods for intra-canopy photon delivery, provide even photon delivery or lighting across a large area, provide direct, normal, incident, and/or diffuse light, and also aid in the general movement of air in the areas where living organisms are nurtured. This may be important both for delivering air and moisture for organism respiration, but also for strengthening organisms, for example by moving plant stalks and leaves in the area of interest 170.

In an embodiment, the photon delivery device 100 may include a light source or light sources 110 which are mounted to a housing member 120, and are configured to rotate around a center axis 160 through some motive method, inclusive of but not limited to, motors and pulleys 130. The light source(s) 110 would be rotated at a variety of revolutions per minute (RPM's), to evenly distribute the light or photons across an area of interest 170, and, with the possible addition of an air control surface, such as a fan blade 120, to provide airflow for the area of interest 170.

As there is a different linear velocity for all points along a housing member 120 away from the center of rotation 160, the "photon concentration" may vary, increasing with radial distance from the center axis 160 in a way to keep a constant time-averaged photon concentration throughout the illuminated area or area of interest 170, in order to create an even distribution of photons (illumination).

In an embodiment, a desired distribution of photons may be generally even and in the range of 0.5-5,000 micromoles per square meter per second. It will be appreciated that an uneven distribution, and in other concentrations may be desirable based on the use case for a photon delivery system or device.

In one embodiment, the photon delivery device 100 could be mounted as a typical "ceiling fan-like" configuration, with the housing members 120 parallel to the floor; in another envisioned embodiment, the photon delivery device 100 could be mounted at other angles, including at the sides of a plant canopy or area of interest 170, with housing members 120 generally normal to the floor, or at any other angle that would aid in air flow, and/or photon capture. In another embodiment, the photon delivery device 100 in any angular orientation could also be mounted on a "light mover", such as a device or system to move the photon delivery device 100 in a desired pattern to maximize the area illuminated by moving photon delivery device 100 through some mechanical device, system, or method.

The distance of the photon delivery device 100 from area of interest or the plant canopy can have an impact on effective photon capture of the plants. If the photon delivery device 100 is too close, the plant or other organisms can suffer from "light poisoning". If the photon delivery device 100 too far from the area of interest 170 or the canopy, there may be photon loss due to photons being absorbed by floors, walls, fixtures, plant trays, etc. The photon delivery device 100 could have the adjustable height, either through a manual method done by a user, or by some automated mechanical device, system, or method. This could include automatic sensing of the canopy height or area of interest 170, what a pre-selected distance from the canopy top or other area of interest 170 top to the photon delivery device 100.

Given that plants start out small (smaller diameter canopy), then grow, the photon delivery device 100 could also provide a means of limiting the irradiated radius, to save energy both in lighting itself, and heat generated. This could be accomplished by either turning light sources 110 on and off as a function of the radial distance from the center axis 160 or dimming light sources 110 in a way that meets the goal, or any combination of these methods.

There is also the fact that direct, normal, incident, and/or diffuse light is more beneficial to photosynthesis than just direct light. For instance, some greenhouses may use diffusing glass to benefit their plants. Also, it can be observed in many greenhouses that supplemental lighting is frequently over the aisle ways, rather than the plant themselves. Rotating an emitter 110 would add considerable variation to the photon direction to any given plant cell, and there may be an added benefit from this configuration even where a single light source is rotated at around a central axis 160.

"Flashing light" has been shown to have a beneficial photosynthetic effect on some plant species. The rotation of a light source or sources 110 above an area of interest 170 may act as "flashes" from the viewpoint of any given organism, so speed of rotation or change of speed of rotation, may be used to improve photosynthesis, or other physiological processes. Flashing may be used in combination with varying the speed rotation of to gain beneficial results. Other techniques such as varying the voltage or current to the emitter, or varying the brightness of the emitters, dimming the emitters, or pulse width modulating the power to the emitters, or combinations thereof, may be used for beneficial results.

Providing generally even illumination and having continuous air flow may be challenge for many large spaces where people live and work, such as restaurants, warehouses, manufacturing areas, airplane hangars, and similar spaces. The illumination properties outlined above will likely be beneficial in these areas of interest 170.

Lighting is typically characterized in "lumens", which refer to the total quantity of visible light emitted by a source as weighted by the human eye's sensitivity to various wavelengths. A typical physiological effect, like the photosynthetic effect for instance, is not about lumens, but rather about the mechanism by which the organisms take light energy (photons) and convert that into chemical energy (sugar).

Figure 2:
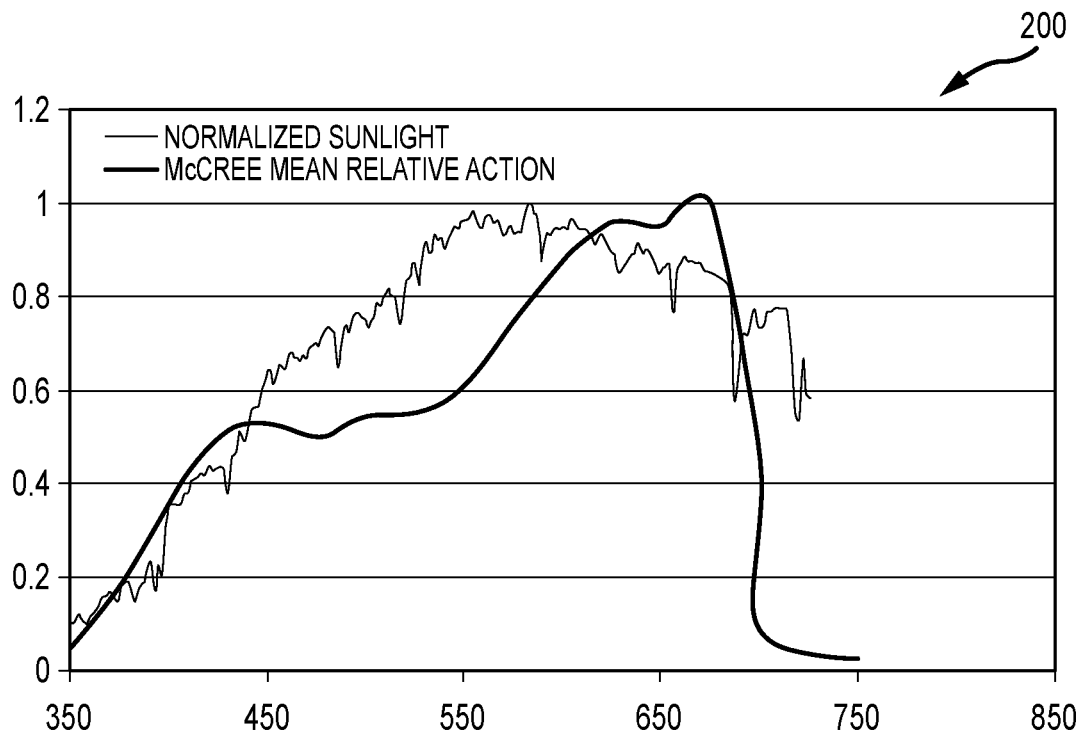
FIG. 2 is an example graph of normalized sunlight and McCree mean relative action.

In current crop ecology, the two most popular definitions of photosynthetically active radiation (PAR) are the irradiance (radiant power flux density) in the waveband 400 to 700 nanometers (nm), and the quantum flux density in the same waveband. Calculations show that the quantum flux measurement is less subject to the systematic error caused by the spectral response not matching the action spectrum for photosynthesis in an "average crop plant". Therefore, photon flux density is the preferred method of measuring the efficacy of a given light source in delivering PAR. A graph 200 of what has become known as the "McCree Curve" is shown in FIG. 2, with a relative measure of sunlight superimposed.

Photosynthetic Photon (Quantum) Flux Density (PPFD) is one method of photon measurement. PPFD is a measurement of the PAR light (photons) that reach the target, plant, or area of interest each second. PPFD is measured over a one-meter square area in "micromoles per square meter per second" and expressed as $\mu mole/((meter^2) \times (second))$. This is bulk measure of the number of photons, regardless of wavelength, and may be measured with a special photodetector with a filter that will only pass photons in the PAR range.

Figures 3A, 3B:
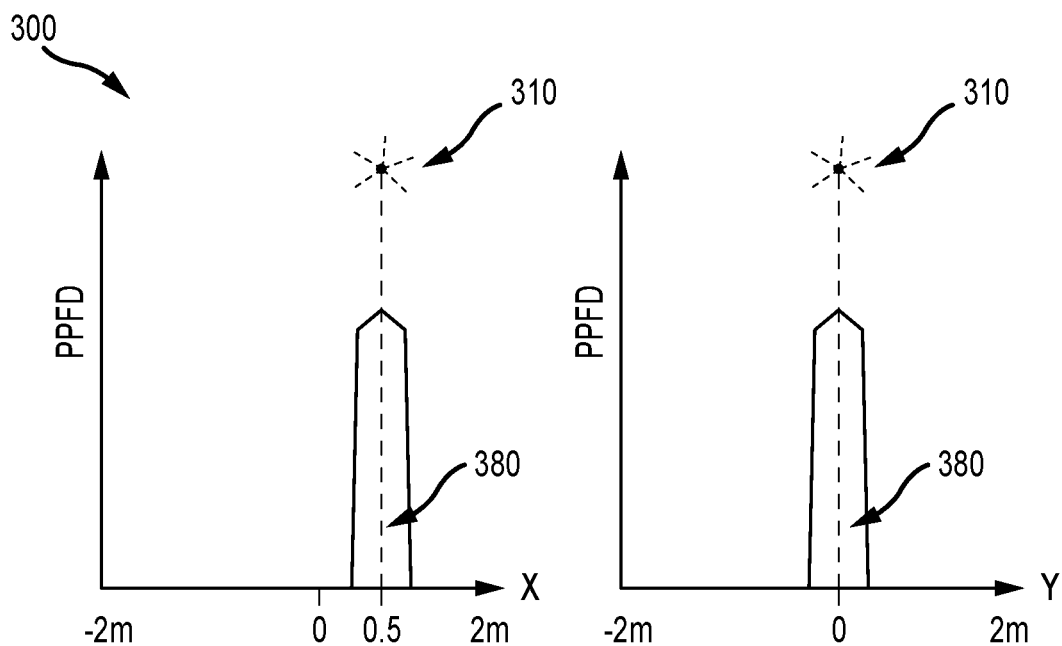
FIG. 3A shows an area of irradiance in two dimensions for a single electromagnetic radiation emitter, according to an embodiment.
FIG. 3B shows an area of irradiance in two dimensions for a single electromagnetic radiation emitter, according to an embodiment.

For the purpose of this description, graphs in FIGS. 3A and 3B will show a graphical representation 300 of the PPFD (or some relative representation of it) for a plane or area of interest with some defined orientation to a given light source 310. This can be thought of as the number of photons delivered to that area. In the example of a plant canopy as the area of interest, the leaves are at many different levels, and may cause the area of interest to be multi-dimensional and difficult to define. Therefore, a flat plane model will be used for example purposes throughout this disclosure.

Light emitters generally do not emit light in an even manner over a broad area. It is more straightforward from an optics perspective to focus light into a small area, rather than to disperse light evenly over a larger area. The embodiments of this disclosure are directed to providing even light over a large area by moving focused emitted beams over a large area, rather than trying to manipulate stationary focused emitted beams, using beam shaping devices, to create even light over a large area.

First, consider a single LED as a source of light 310. This is not a typical horticultural use case, but the notion will be useful in understanding the fundamental concepts. A single LED, with planar encapsulant, will typically have a "Lambertian" distribution, which has a cosine relationship of illumination intensity, with tapering from highest level to zero over an angular sweep of −90° to +90° from the center line 380. Since the cosine relationship emits light over large angular ranges without significant control over the photon pattern, it means that luminous flux from the source decreases as the distance to the area of interest increases. Therefore the use of reflectors, lenses, or free-form illumination control optics with LEDs may provide tightly focused direct light. If a reflector that concentrates the bulk of the light into a narrow bundle is used, it would exhibit an intensity pattern such as that shown in FIGS. 3A and 3B.

This emission pattern does not vary significantly with varying distance. FIGS. 3A and 3B show a graphical representation of a focused LED emitter 310, set at 0.5 meters in the x direction, and 0 meters in the y direction, on the area of interest, which in this example is 0.5 meters in the z direction from the light source. The vertical axis is in Photosynthetic Photon Flux Density (PPFD), but the units are simple estimations of what a typical distribution might look like.

As shown in FIGS. 3A and 3B, using a collimated light source 310 causes many photons in one small area. For an example of horticultural lighting, the purpose is to create light very similar to sunlight, which has very even light across a broad area. Attempts to spread a light source 310 as shown in FIGS. 3A and 3B tend to create uneven light, with greater PPFD in the center 380, and quickly tapering to much less light away from the center 380.

Figure 4:
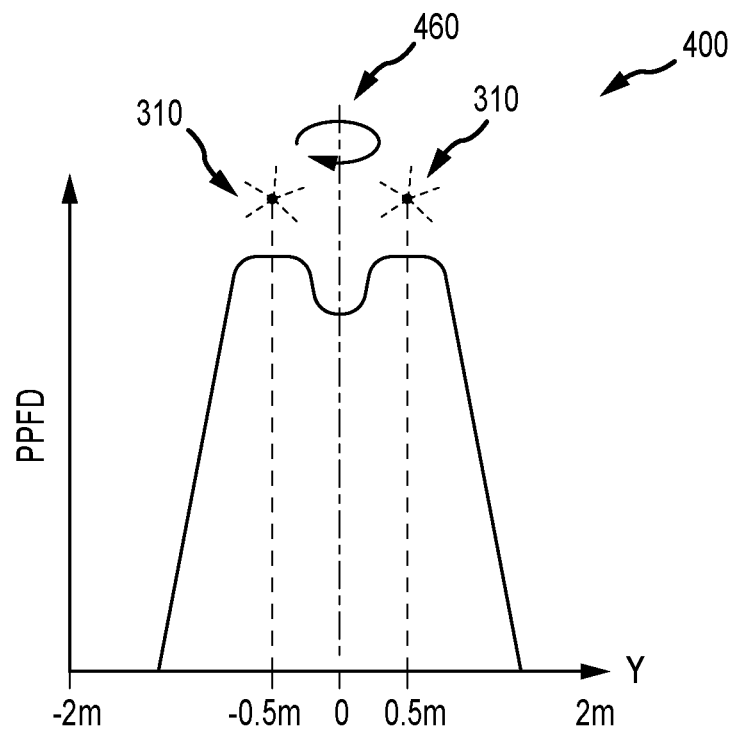
FIG. 4, shows an area of irradiance for a single electromagnetic radiation emitter rotated around a central axis, according to an embodiment.

FIG. 4 shows a graphical representation of PPFD 400 with the focused light source 310 from FIGS. 3A and 3B rotated around the 0 axis or center axis 460. A greater area is covered with a far more even PPFD. Given that the light source 310 is now rotating around an axis 460, the "meters squared" is greater, and the PPFD is lower, as shown in FIG. 4.

Figure 5:
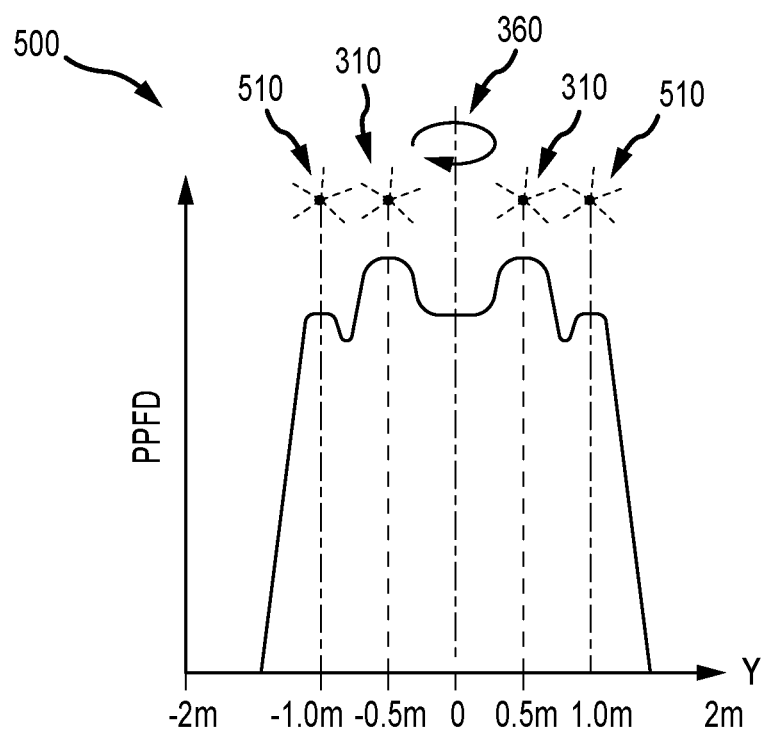
FIG. 5 shows an area of irradiance for two evenly spaced electromagnetic radiation emitters rotated around a central axis, according to an embodiment.

FIG. 5 shows a graphical representation of PPFD 500 with a second LED 510 of similar power is added at a distance of twice the radius of the first LED 310 from the central axis 560. Since that LED 510 is rotating at the same Angular Velocity, but a higher linear velocity, the same amount of photons cover a greater area, resulting in less photon density A source with same magnitude and optical characteristics should always illuminate the same area. In the case of a rotating set of emitters, to achieve this, the radius from the rotating center will need to be a function of a constant area of illumination.

Figure 6:
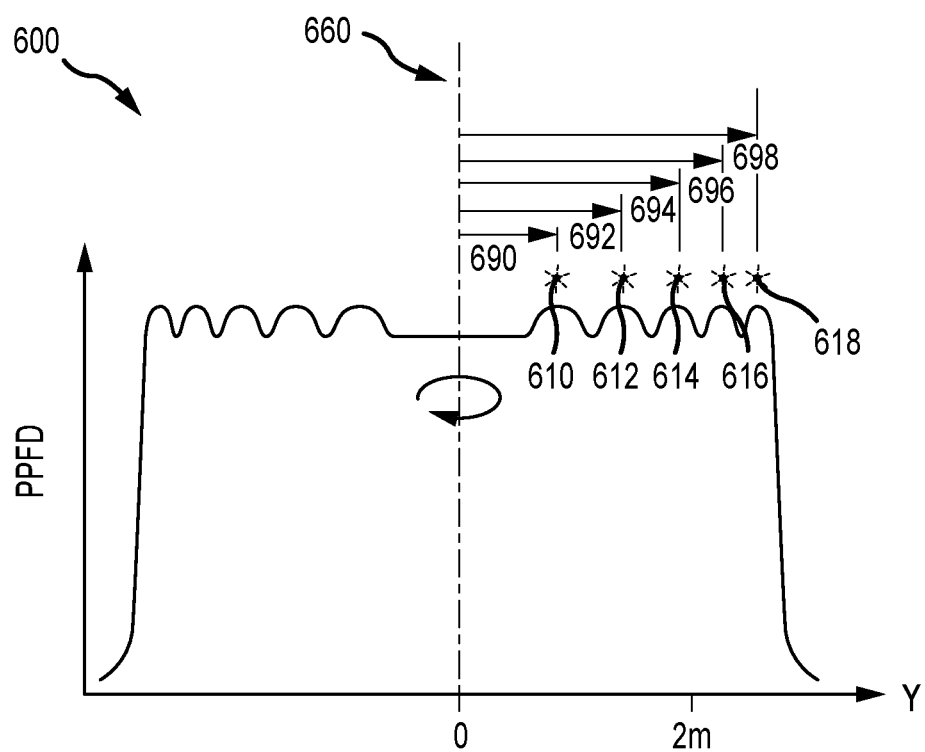
FIG. 6 show an even area of photon distribution for a set of electromagnetic radiation emitter s with uneven spacing, rotated around a central axis, according to an embodiment.

FIG. 6 is a graphical representation 600 of an example system or device configuration. The following radial area irradiance calculation may be used to achieve this, for any number of light sources of similar magnitude and optical characteristics:

1. Calculate how much area can reasonably be illuminated by a light source to achieve the desired amount of photons per unit area for the use case:

$$\text{Area of Illumination} = A_r = \frac{(\text{Source Watts}) \cdot (\text{source efficiency})}{\frac{\text{Watts}}{\text{Unit Area}}} \quad \text{Equation 1}$$

defining the required area for the given illumination requirements

Where source watts is the power provided to the emitter. The source efficiency is the power conversion efficiency of the emitter. Watts per unit area is the desired flux of radiant energy per unit area, which can also be expressed as micromoles of photons per square meter per second.

2. Solve for the radius for the first emitter, by using Equation 2 below:

$$R_{center} = \sqrt{\frac{A_r}{\pi}} \quad \text{Equation 2}$$

Calculation of center circle illumination radius for the emitter, based on the result of Eq. 1.

3. Calculate the position of the first light source at the center of defined area:

$$R_{p1} = \frac{R_{center}}{2} \quad \text{Equation 3}$$

Calculation of the position of the light source on the housing member

Calculate each additional radii for additional emitters until there are enough light sources to meet the requirements of the desired distribution of photons to an area of interest. The radius for each of the concentric circles is a function of the previous radius, regardless of if that radius is for the center circle or a preceding concentric ring:

$$A_r = \pi R_y^2 - \pi R_x^2 \therefore R_y = \sqrt{\frac{A_r + \pi R_x^2}{\pi}} \quad \text{Equation 4}$$

Definition of calculation of each additional radial area

The light source (1 . . . n) is then placed at the location per the equation below:

$$R_{pn} = R_x + \frac{R_y - R_x}{2} \quad \text{Equation 5}$$

Definition for location of light source relative to the center axis of rotation

FIG. 6 is a graphical representation of positions of five emitters 610, 612, 614, 616, 618, at certain distances 690, 692, 694, 696, 698 from the central axis 660 calculated using Equations 1-5, for an embodiment with a particular desired distribution of photons to an area of interest.

Figure 7A:
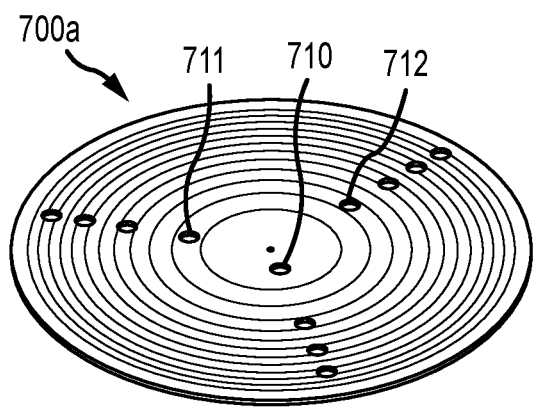
FIG. 7A is an example graphical representation for the concentric illuminated areas around a first circular area of the calculations for the embodiment for Table 2.
Figure 7B:
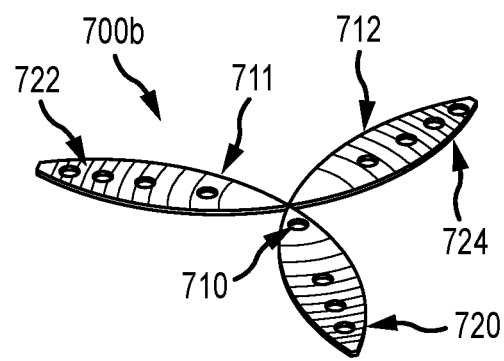
FIG. 7B is an example representation of electromagnetic radiation emitter placement on three housing members to achieve the desired irradiance of the calculations in Table 2, according to an embodiment.

Table 1 and Table 2 below shows calculations used in the example of a use case. The resulting positioning of emitters and the areas illumined by the emitter is shown in FIGS. 7A and 7B.

TABLE 1

Example of values for one lighting situation

| Quantity | Units | Comments |
|---|---|---|
| 100 | watts | COB Power Requirement |
| 40 | watts/ft^2 | Assumption of irradiation requirement |
| 50% | % | LED efficiency |
| 1.25 | ft^2 | required area for each light |
| 200 | rpm | Fan Speed |

TABLE 2

Example of spacing and positioning for light sources spread out over three rotating hosing members

| | Area | Radius (ft) | Radius (In) | Position (In) | Housing member |
|---|---|---|---|---|---|
| 1 | 1.25 | 0.63 | 7.5694 | 3.7847 | 1 |
| 2 | 2.5 | 0.89 | 10.7047 | 9.1371 | 2 |
| 3 | 3.75 | 1.09 | 13.1106 | 11.9077 | 3 |
| 4 | 5 | 1.26 | 15.1388 | 14.1247 | 1 |
| 5 | 6.25 | 1.41 | 16.9257 | 16.0322 | 2 |
| 6 | 7.5 | 1.55 | 18.5412 | 17.7334 | 3 |
| 7 | 8.75 | 1.67 | 20.0267 | 19.2840 | 1 |
| 8 | 10 | 1.78 | 21.4095 | 20.7181 | 2 |
| 9 | 11.25 | 1.89 | 22.7082 | 22.0588 | 3 |
| 10 | 12.5 | 1.99 | 23.9365 | 23.3224 | 1 |
| 11 | 13.75 | 2.09 | 25.1049 | 24.5207 | 2 |
| 12 | 15 | 2.19 | 26.2212 | 25.6630 | 3 |
| 13 | 16.25 | 2.27 | 27.2919 | 26.7565 | 1 |
| 14 | 17.5 | 2.36 | 28.3221 | 27.8070 | 2 |
| 15 | 18.75 | 2.44 | 29.3162 | 28.8191 | 3 |

In FIG. 7A, the location of emitters 710-712 are shown as concentric circles around a first generally circular area. This is a graphical representation 700*a* of the two dimensional area near the device (not shown) of area illuminated by the various emitters. This embodiment includes 12 emitters. It will be appreciated that other numbers of emitters can be used for different desired distributions of photons to different areas of interest, and other design considerations.

FIG. 7B shows a graphical representation 700*b* of the location of emitters 710-712 on housing members 720-724 for this embodiment. In this embodiment the emitter closest to the center is placed on housing member 720. The next closest emitter is placed on housing member 722. The next closest is positioned on housing member 724, etc. It will be appreciated that other positioning may be used based on design considerations, power delivery, photon delivery, the area of interest, etc. and combinations thereof.

The method above will work well for light sources that are essentially "point" sources. In the case of LEDs, a cluster of chips on a "Chip on Board" (COB) configuration would generally, but not exactly, act like a point source of light.

Another method to achieve equal irradiance with points of light evenly spaced along an axis normal to the axis of rotation would be to use the same method above to set "zones of irradiance", and use a diming technique, such as either current limits or Pulse Width Modulation (PWM) to keep the irradiance even. In this case, the 100% power would be at the very outside radius, with power diminishing closer to the axis of rotation.

Figure 8A:
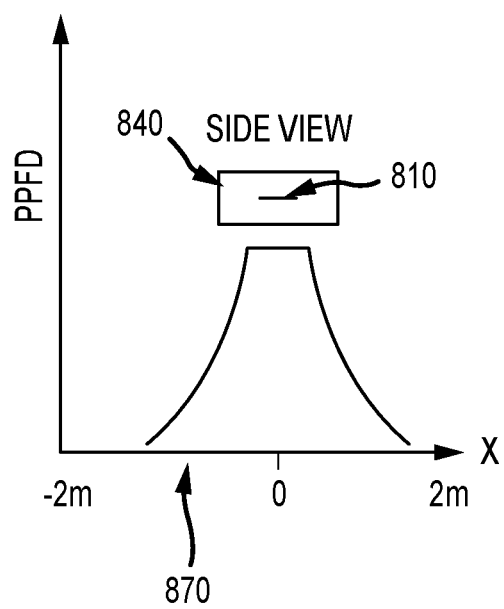
FIG. 8A is a side view of an irradiated area of a line electromagnetic radiation emitter, according to an embodiment.
Figure 8B:
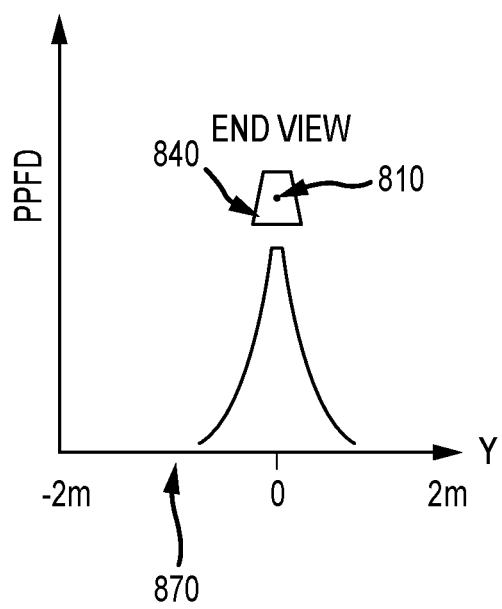
FIG. 8B is an end view of an irradiated area of a line electromagnetic radiation emitter, according to an embodiment.
Figure 8C:
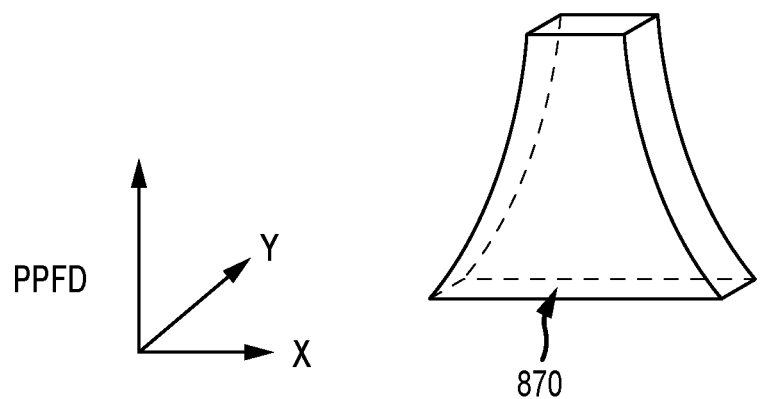
FIG. 8C is a three dimensional view of an irradiated area of a line electromagnetic radiation emitter, according to an embodiment.

For a light source, such as a High Pressure Sodium Lamp (HPS) (typically used in horticultural settings today), the light source is small diameter cylinder of gas, perhaps 0.1 meters long. This can be considered a "line source" of emitted radiation. It may be set inside a reflector. T function of the reflector is to disperse the light over a large area but send as much downward toward the canopy or area of interest as possible. However, since the intensity is inversely proportional to the square of the distance from the line source, the irradiated area of a line emitter is shown in FIGS. 8A-8C. In FIGS. 8A-C, the area of interest 870 is 0.5 meters below the line emitter 810 and reflector 840.

FIG. 8A is a side view of the irradiated area of a line emitter 810. FIG. 8B is an end view of the irradiated area of a line emitter 810. FIG. 8C is a three dimensional view of the irradiated area of a line emitter 810.

Figure 9:
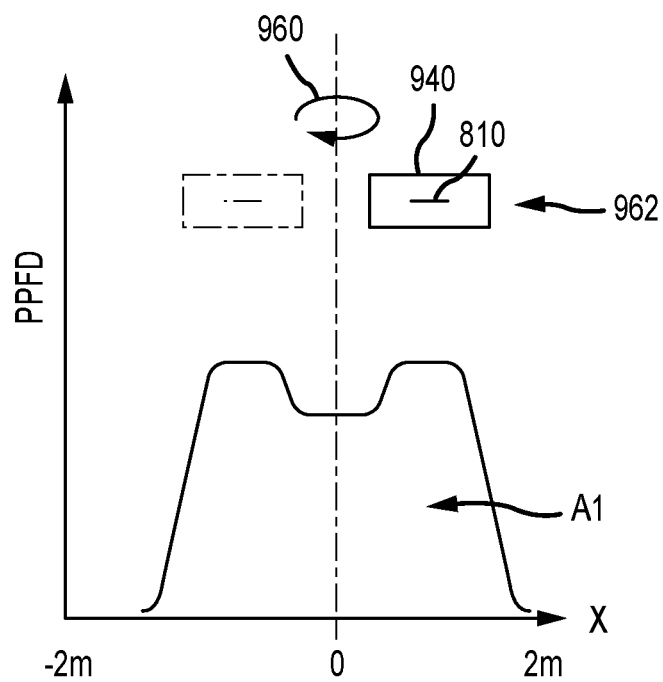
FIG. 9 shows an area of irradiance in two dimensions for a line electromagnetic radiation emitter, according to an embodiment.

If that same line light source 810 is rotated, with the long axis normal 962 (in FIG. 9) to a central axis of rotation 960, a greater area is covered with a far more even PPFD. Given that the light source is now rotating around axis 960 (in FIG. 9), the "meters squared" is greater, so the PPFD is lower.

Figure 10A:
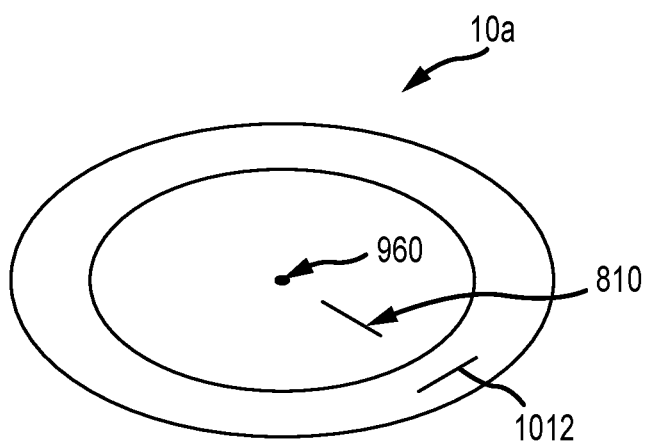
FIG. 10A is a graphical representation of line electromagnetic radiation emitter placement on housing members to achieve a desired irradiance, according to an embodiment.
Figure 10B:
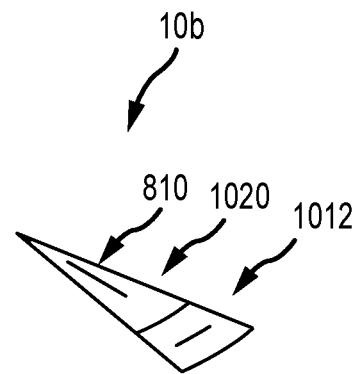
FIG. 10B shows an example housing member with the positions of line sources to achieve the desired irradiance of FIG. 10A.

Now, if the area covered by the first light source 810 is thought of as A1, then a second light source 1020 (in FIG. 10A) could be added to the device and rotation, to continue the even lighting over a larger area. But, if the second light source 1012 is farther from the center line of rotation 960, the area covered per unit time is greater, so the change in radial distance from the central axis 960 needs to be smaller. And, in the case of the line source 810, such as HPS, the line source for each additional light might be placed at some angle to the radius 962, but parallel to the area of interest. FIG. 10B shows a housing member 1020 with the positions of line sources 810 and 1012.

This angle might be calculated either by empirical methods (changing the angle, and looking at the illumination over the needed area, to get the angle right), or perhaps by an analytical method like the one shown below:

1. Utilize Eqns. 1-5 as defined above for the "point source".

Now, to achieve even irradiance, the first "area" will have the "line" or long axis of the light source at $A_{p1}$ parallel to the light axis, parallel to the floor, and normal to the axis of rotation. In one example, as shown below, a second light source was placed at 90 degrees to the $1^{st}$, at the center of the outer area.

Below in Table 3 and Table 4 is one embodiment of how this calculation for determination of location of a line source might be executed; FIG. 10A shows what the configuration and coverage would be:

TABLE 3

Example of values for one lighting situation

| Quantity | Units | Comments |
|---|---|---|
| 600 | watts | HPS Bulb Power Requirement |
| 40 | watts/ft^2 | Assumption of irradiation requirement |
| 50% | % | HPS efficiency |
| 7.5 | ft^2 | required area for each light |
| 200 | rpm | Fan Speed |

TABLE 4

Example of spacing for light sources spread
out over three rotating housing members

|   | Area | Radius (ft) | Radius (In) | Position (In) |
|---|------|-------------|-------------|---------------|
| 1 | 7.50 | 1.55 | 18.5412 | 9.2706 |
| 2 | 15.0 | 2.19 | 26.2212 | 22.3812 |

The air control surfaces (housing members) of the photon delivery device could be straight (as with a conventional ceiling fan) or sculpted into a shape that would direct light in a beneficial way. The housing members could be shaped to maximize airflow and could be shaped to create an oscillating effect during rotation, to improve air delivery for plant strengthening and/or other benefits.

Figure 11A:
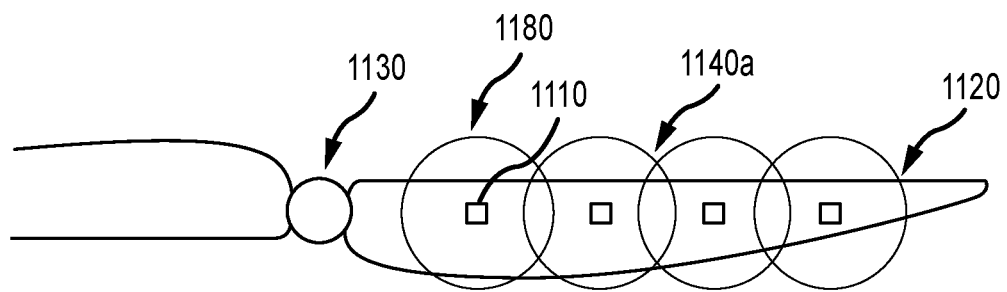
FIG. 11A shows a pattern of irradiance for a point electromagnetic radiation emitters, according to an embodiment.

FIG. 11A shows an embodiment of a photon delivery device 1100, which includes a rotation device 1130, housing member 1120, emitter 1110 and EMIR shaping apparatus 1114a. Also shown in FIG. 11 is pattern of irradiance 1180 created by shaping apparatus 1140a acting on the emitted radiation from emitter 1110. In this embodiment, the irradiation area is generally circular.

Figure 11B:
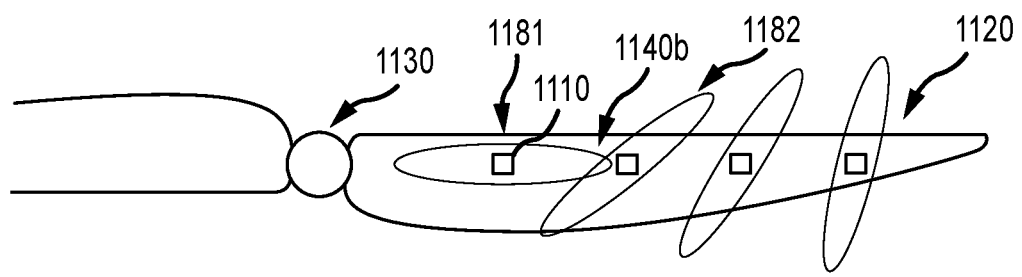
FIG. 11B shows a pattern of irradiance for a point electromagnetic radiation emitter using light shaping apparatuses, according to an embodiment.

FIG. 11B shows the photon delivery device 1100 of FIG. 11A, with different EMIR shaping apparatuses 1140b which create a different irradiation area 1181. In this embodiment, irradiation area or pattern may be generally elliptical. The pattern may be based on the use case and the desired photon delivery to the area of interest.

Shaping apparatuses 140 may create light density variation by a combination of anamorphic light lenses and position of those lenses both in terms of distance along the housing member 1120 longitudinal axis, and at differing angles to the longitudinal axis of the housing member 1120.

In an embodiment, emitters emitting radiation in the 100-400 nanometers mounted on the assembly may be used to kill molds and pests, like spider mites, as well as, for light signaling. Light signaling (or "photomorphogenesis") may include small doses of particular wavelengths by themselves or in combination delivered, which may cause beneficial response in living organisms.

Figure 12:
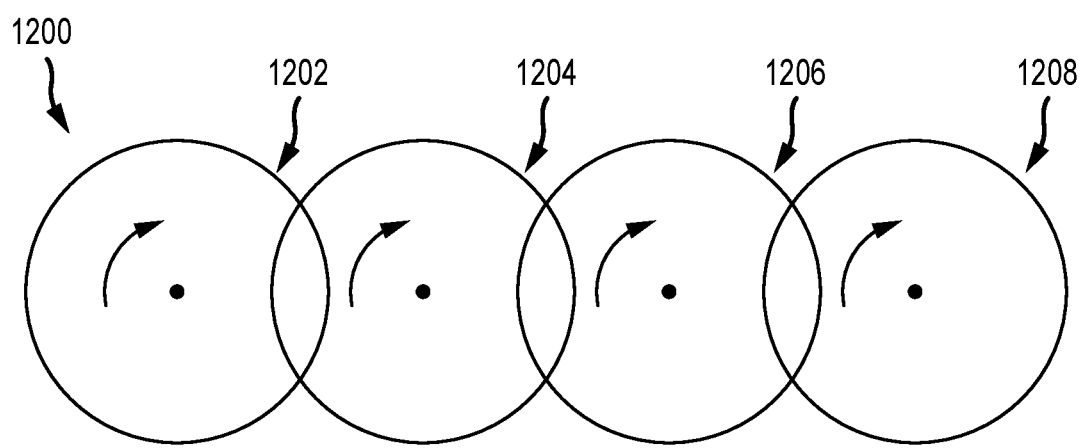
FIG. 12 shows multiple photon delivery devices coupled to allow interleaving of the housing members of the respective photon delivery devices to achieve a desired distribution of photons, according to an embodiment.

FIG. 12 shows an embodiment of a photon delivery system 1200, which includes photon delivery devices 1202, 1204, 1206, 1208. Delivery devices 1202-1208 may be controlled so that housing members of each device may interleave and not contact each other. This may be used for to provide a desired distribution of photons to an area of interest. System 1200 may also include software or hardware algorithm to dim or control the lights where the housing members overlap to create even photon density, or to provide a desired distribution of photons to an area of interest. This orientation and control may also save energy and create a more desired air flow for the use case.

Figure 13:
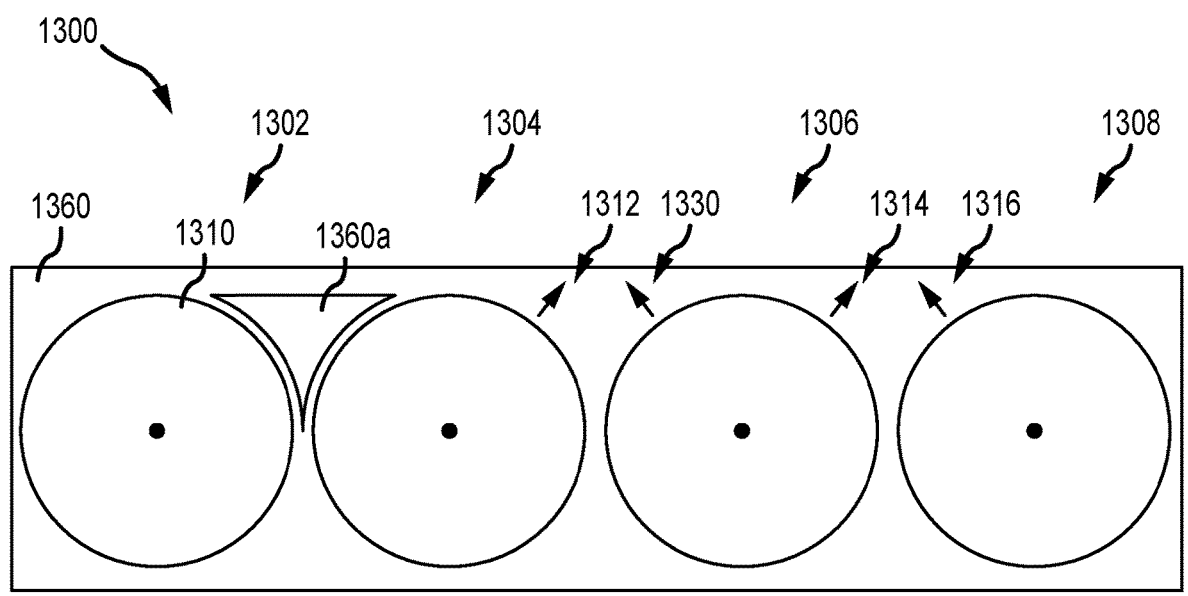
FIG. 13 multiple photon delivery devices with electromagnetic radiation emitters generally at the end of the housing members to achieve a desired distribution of photons to a generally rectangular area of interest, according to an embodiment.

FIG. 13 shows an embodiment of a photon delivery system 1300, which includes photon delivery devices 1302, 1304, 1306, 1308. Devices 1302-1308 may each include an emitter 1310-1316 at the outer edge of housing members of the devices 1302-1304 to provide a desired distribution of photons to generally rectangular area of interest 1360.

In this embodiment, area of interest 1360 include generally pie shaped portions like 1360a, for which emitters 1310-1316 are capable of providing generally even photon distribution. For this configuration of system 1300, area of interest 1360 is generally rectangular. Although areas of interest are shown generally as a two dimensional area, area of interest can be other configurations including three dimensional.

System 1300 may include overlapping housing ember(s) and/or blade(s), either coupled mechanically, via logic, or with differentiated height in the "Z" direction, to create a roughly rectangular shaped pattern of irradiance or area of interest 1360.

Figure 14:
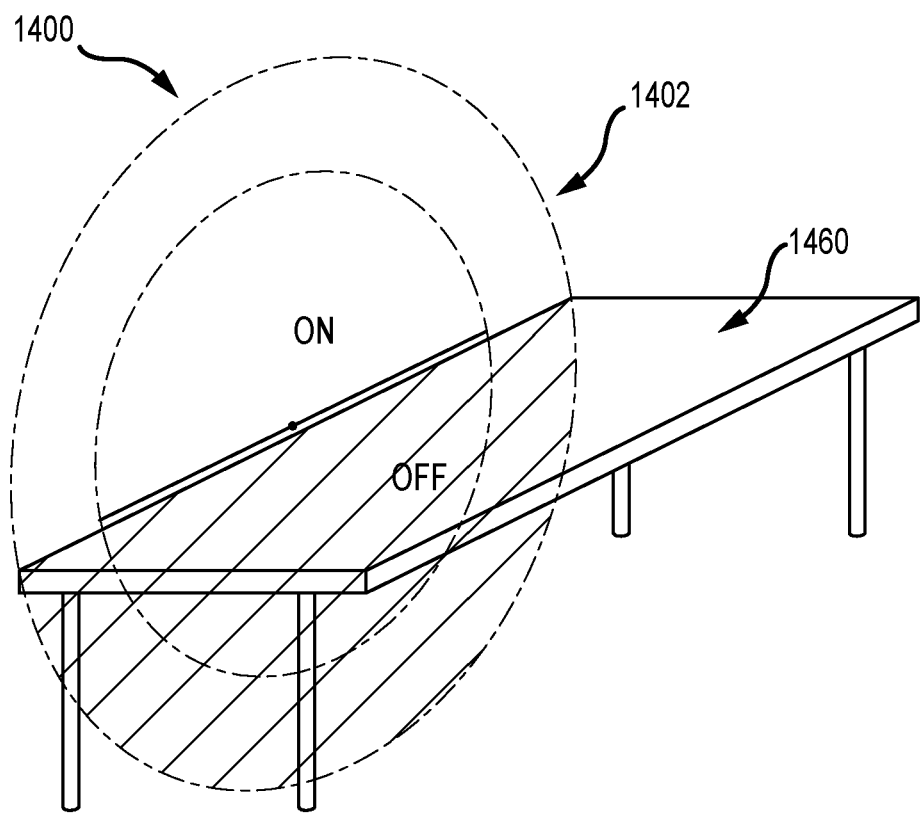
FIG. 14 shows a pattern of powering electromagnetic radiation emitters for a photon delivery device with housing members generally vertical, according to an embodiment.

FIG. 14 shows an embodiment of a generally vertically oriented photon delivery device 1402 configured to deliver photons to area of interest 1460. As shown, the emitters may be on or powered when the housing member is generally above the area of interest 1460, and off when below the area of interest 1460. This may provide photons to the area of interest at an angle other than directly above. It will be appreciated that photon devices may be positioned to deliver photons from many different orientations and angles, including from below.

Plants are usually on some type of riser or table (as in the FIG. 14), to make maintenance by human users easier. Also, the height of the flower pot or bucket is usually a design consideration. In the case of side photon delivery, the "horizon" or base of the plant could be used as an artificial plane for the area on interest, and the lights turned off as they dip below that plane, and turned back on as they rise back above it. This may only send photons to the canopy or area of interest where desired, rather than wasting photon on the undersides of tables, risers, and the sides of flow pots.

Figure 15:
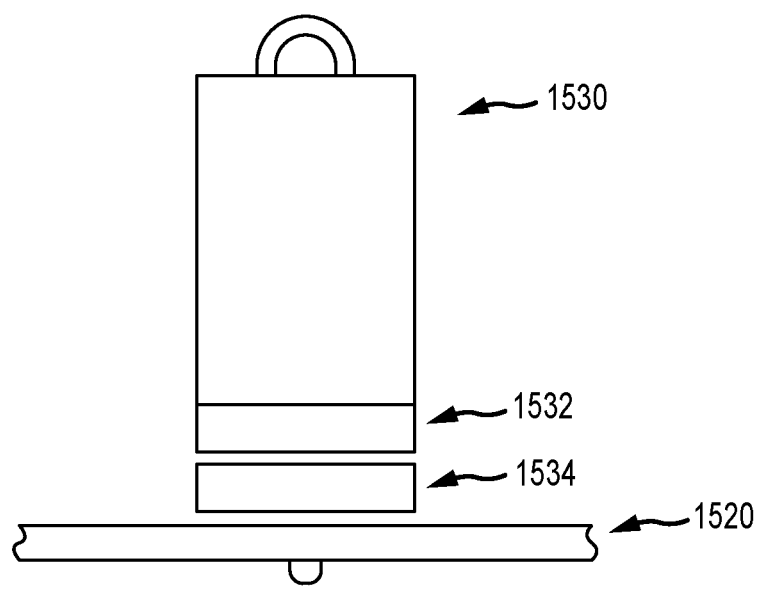
FIG. 15 is a rotational device, according to an embodiment.

FIG. 15 shows embodiments of a rotational device 1530. In this embodiment rotational device 1530 includes a housing member 1520, a rotor 1532 and a stator 1534. In an embodiment rotational device 1530 may include a slip-ring configuration for powering the emitters from the same power source as the rotational device 1530.

In an embodiment, rotational device 1530 mat include a rotary transformer to deliver power to the emitters on the housing members. This configuration would eliminate the need to a "slip ring", or other type of electro/mechanical coupling to a stationary power source. A slip ring includes brushes that can wear, and may expensive to manufacture. The rotary transformer has the potential to both be less expensive to manufacture, and have a longer life, while still providing the same benefits. The rotary transformer may provide an AC power that would efficiently supply power to the emitters.

In an embodiment, power may be supplied to the emitters from the motor as a generator; i.e. using the spinning motion of the motor to create a field that would generate sufficient power to the light sources, eliminating the need for a "rotary transformer", "slip ring", or other type of electro/mechanical coupling of the photon delivery device to a stationary power source.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

We claim:

1. A photon delivery device, comprising:
   one or more housing members;

a rotational device coupled to the one or more housing members, configured to rotate the housing members about a central axis;

one or more electromagnetic radiation emitters coupled to the one or more housing members; and a sensor system comprising a plurality of sensors each coupled to at least one of the one or more housing members, configured to provide an output signal as a function of the radial area each individual sensor covers during rotation of the corresponding housing member.

2. The photon delivery device of claim 1, wherein at least one of the one or more electromagnetic radiation emitters are coupled to at least one of the one or more housing members at a plurality of positions at different radius from the central axis, to achieve the generally even distribution of photons to the area of interest.

3. The photon delivery device of claim 1, wherein the one or more electromagnetic radiation emitters are coupled to at least one of the one or more housing members at a plurality of positions at different radius from the central axis, and an intensity of emitted radiation from the one or more radiation emitters at a first radius is different from an intensity of emitted radiation from the one or more radiation emitters at a second radius different from the first radius.

4. The photon delivery device of claim 1, further comprising a controller for controlling the intensity of the one or more electromagnetic radiation emitters to achieve a desired of distribution of photons to the area of interest.

5. The photon delivery device of claim 1, further comprising a rotary transformer coupled adjacent the rotational device and electrically coupled to the one or more electromagnetic radiation emitters, configured to provide at least a portion of the electricity needed to operate the one or more electromagnetic radiation emitters or sensors.

6. The photon delivery device of claim 1, further comprising a controller for controlling photon output of the one or more electromagnetic radiation emitters is varied to achieve a desired distribution of photons to an area of interest.

7. The photon delivery device of claim 6, further comprising a controller for controlling the photon output at least in part via width modulation control of the one or more electromagnetic radiation emitters.

8. A photon delivery device for facilitating photosynthesis, comprising:

one or more housing members;

a rotational device coupled to the one or more housing members, configured to rotate the housing members about a central axis;

one or more electromagnetic radiation emitters coupled to at least one of the one or more housing members; and a sensing system configured to sense characteristics of an area of interest and provide output signal, wherein the sensing system comprises a plurality of sensors each coupled to at least one of the one or more housing members, configured to provide an output signal as a function of the radial area each individual sensor covers during rotation of the corresponding housing member;

wherein output signal is used to control the one or more electromagnetic radiation emitters, or the speed of rotation.

9. The photon delivery device of claim 8, wherein the sensing system is configured to sense at least one of temperature, change in spectra, change in light intensity, airflow, distance, and change in carbon dioxide concentration.

10. The photon delivery device of claim 8, wherein the sensing system comprises one or more sensors, wherein the output information of the sensor system is modified as a function of the radial area covered by a sensor of the one or more sensors, during rotation.

11. The photon delivery device of claim 8, further comprising a controller configured to control the speed of rotation to provide the desired distribution of photons to an area of interest.

12. The photon delivery device of claim 8, wherein the device produces a desired distribution of photons in the range of 0.5-5,000 micromoles per square meter per second, generally even to the area of interest.

13. The photon delivery device of claim 8, wherein the one or more electromagnetic radiation emitters coupled to at least one or more housing members are disposed at a plurality of positions at different radius from the central axis, to achieve even distribution of photons to the area of interest.

14. The photon delivery system of claim 8, further comprising a controller for controlling the intensity of the one or more electromagnetic radiation emitters to achieve a desired of distribution of photons to the area of interest.

15. The photon delivery device of claim 8, further comprising a rotary transformer coupled adjacent the rotational device and electrically coupled to the one or more electromagnetic radiation emitters, configured to provide at least a portion of the electricity needed to operate the one or more electromagnetic radiation emitters or sensors.

16. A photon delivery device configured to deliver an amount of photons to an area of interest, comprising:

one or more housing members;

a rotational device coupled to the one or more housing members, configured to rotate the housing members about a central axis;

one or more electromagnetic radiation emitters coupled to the one or more housing members; and a sensor system comprising a plurality of sensors each coupled to at least one of the one or more housing members, configured to provide an output signal as a function of the radial area each individual sensor covers during rotation of the corresponding housing member.

17. The photon delivery device of claim 16, further comprising a controller for controlling the desired distribution of photons comprising time varying normal, and time varying incident, delivery of photons.

18. The photon delivery device of claim 16, further comprising reflectors or lenses.

19. The photon delivery device of claim 16, further comprising a controller configured to control the speed of the rotational device to provide the generally even distribution of photons to an area of interest, or a controller for controlling the intensity of the one or more electromagnetic radiation emitters to achieve the generally even distribution of photons to the area of interest.

20. The photon delivery device of claim 16, further comprising a rotary transformer coupled adjacent the rotational device and electrically coupled to the one or more electromagnetic radiation emitters, configured to provide at least a portion of the electricity needed to operate the one or more electromagnetic radiation emitters or sensors.

* * * * *